Patented June 28, 1932

1,864,909

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

SYNTHETIC RESIN

No Drawing. Application filed July 18, 1931. Serial No. 551,798.

This invention relates to synthetic resins and more particularly to the polyhydric alcohol organic acid type.

In the past many esters of polyhydric alcohols and organic acids and particularly glycerin and polycarboxylic acid, such as phthalic anhydride, have been prepared and have acquired a great importance in the resin industry. The simpler ester resins of this type such as those of glycerin and phthalic anhydride can be transformed into infusible and insoluble products on heating but tend to be brittle and in many cases show a poor compatibility with nitrocellulose and other cellulose esters. It has been proposed in the past to modify these resins with simple acids, particularly monobasic acids, such as fatty acids and rosin, and such modified ester resins have achieved great success in commerce, particularly in compositions containing nitrocellulose where their high compatibility and desirable properties have distinguished themselves. There has, however, been some difficulty in the past in obtaining resins of the polyhydric alcohol organic acid type which are at the same time of great strength, satisfactory hardness and light color and which are also sufficiently elastic and compatible with nitrocellulose to be used in the coating industry. It is a relatively simple matter to produce polyhydric alcohol organic acid resins which are hard and can be rendered infusible by heating and it is also easy to produce soft resins of this type compatible with nitrocellulose, but hitherto it has been difficult or impossible to produce compositions in which both desirable properties are displayed, and in a single resin this has been practically unknown.

The present invention covers a new type of polyhydric alcohol organic acid resins many of which can be rendered infusible and have satisfactory hardness and strength but which also are elastic and show a satisfactory compatibility with nitrocellulose without the use of excessive amounts, or in some cases without the use of any, of the ordinary plasticizers. These resins are prepared by reacting a polyhydric alcohol such as glycerin with an organic acid, for example, phthalic anhydride, and phthalide or substituted phthalides. The invention includes not only resins containing only single acids, for example a single dicarboxylic acid in addition to the phthalide, but also includes resins in which other acids are present such as, for example, monocarboxylic acids. The fact that phthalide may be used to replace part of the acids in polyhydric alcohol organic acid resins with desirable improvements in the physical and chemical characteristics of the products opens up a wide field of utility, particularly in combination with cellulose esters. In general the phthalide modified resins are soluble in solvents which will dissolve the unmodified resins but owing to the fact that phthalide, which is the lactone of the oxymethyl benzoic acid, contains an aliphatic alcoholic hydroxyl the solubility of the products in any solvents is generally greater than in the case of the unmodified resins and in some cases phthalide modified resins are soluble in solvents in which the unmodified resins do not dissolve at all. This adds a greater flexibility to the use of the resins of the present invention, particularly in coating compositions, as it widens the choice of solvents which can be used.

While, as has been pointed out above, in some cases plasticizers may be eliminated from compositions containing phthalide modified resins, it should be understood that in many cases it is desirable to add plasticizers, although frequently the quantity added may be considerably reduced. Any of the ordinary plasticizers for polyhydric alcohol organic acid resins may be used. Of particular interest is phthalide itself and substituted phthalides, esters of keto aromatic acids such as benzoyl and naphthoyl benzoic acids, etc.

Among the polyhydric alcohols which may be used, glycerin and glycol are of the greatest commercial importance, but other polyhydric alcohols may be used, singly or in admixture, with glycerin or glycol, or both. Examples of such polyhydric alcohols are butylene oxide, chlorhydrines, ethylene oxide, glycerin ethers, polyglycerols, amylene glycol, butylene glycol, diethylene glycol, glycol methyl ether, glycol propyl ether, polyglycols, propylene glycol, triethylene glycol, 1-2 propylene glycol, 1-3 propylene glycol, 2-3 butylene glycol, mannitol, mannitol ethers, pentaerythrite, pentaerythrite ethers.

Phthalic anhydride is the most common dicarboxylic acid and because of its low price and excellent characteristics in resins containing it, it is of prime commercial importance. However, the invention is in no sense limited to the use of phthalic anhydride as the acid in the resins and on the contrary other acids, both polycarboxylic and monocarboxylic, may be used, singly or in admixture, to replace part or all of the phthalic anhydride.

Examples of the polycarboxylic acids which may be used are substituted phthalic anhydride such as halogen, nitro, or amino; and adipic, azeolaic, boric, camphoric, citric, diglycolic, diphenic, fumaric, glutaric, maleic, malic, malomalic, mellitic, heminellitic, naphthalic terephthalic, tetrachlorphthalic, pyroracemic, sebacic, suberic, succinic, tartaric, and pyrotartaric acids.

Among the monocarboxylic acids which may be used are the following:—abietic, oxidized abietic, arachidic, acetic, aectoacetic, acrylic, hydroacrylic, anthranilic, behenic, benzoic, aminobenzoic, benzoylbenzoic, chlorbenzoic, halogen or nitrobenzoic, naphthoylbenzoic, nitrobenzoic, toluylbenzoic, cinnamic, hydrocinnamic, clupanodonic, congo, copal, erucic, formic, furoic, glutaric, glycolic, glyoxylic, hydroxybutyric, lactic, lauric, lignoceric, linolenic, mucic, myristic, naphthenic, naphthoic, oleic, palmitic, propionic, pyruvic, rape oil, resin acid, ricinoleic, salicylic, stearic, dihydroxystearic, stearolic, toluic, tung oil, rich hydrogenated fatty acids, fat acids of castor oil, fatty acids of hydrogenated castor oil; fat acids of cocoanut oil, corn oil, cottonseed oil, drying oils, nondrying oils, fish oil, linseed oil, mahaden oil, perilla oil, rape-seed oil, soya-bean oil, sunflower seed oil, whale oil; glycerides of oils and fats; mixed fat acids of cocoabutter, castor oil, Japan wax; and heat distilled acids from castor oil, corn oil, cottonseed oil, fish oil, lard, linseed oil, peanut oil, rapeseed oil, soya-bean oil, tung oil.

In addition to unsubstituted phthalide, substituted phthalide such as mono or dialkyl or aryl phthalides, alkylidene phthalides and the like may be employed. Similarly, reduction products of phthalide such as hexahydrophthalide are likewise included.

The invention will be illustrated in the following specific examples which give typical embodiments of the invention, it being understood that it is in no way limited to the specific details therein set forth.

*Example 1*

1 mol of glycerin is heated at 180° C. with 1 mol of phthalic anhydride until evolution of gas ceases, and 1 mol of phthalide is added and heating continued at 210° C. until a test portion withdrawn on a glass rod solidifies to a hard product which is not sticky.

The resin when cold is of light color or substantially colorless, very elastic and is not sticky. It can be drawn and bent without breaking, and when heated for several hours at 260° C. is transformed into an insoluble, infusible resin which shows excellent toughness, being far less brittle than a resin prepared under the same conditions from 1 mol of glycerin and 1½ mols of phthalic anhydride.

The resin in its fusible stage is soluble in solvents for glycerin phthalic resins and can be blended with nitrocellulose with which it shows good compatibility. An impregnating varnish is obtained which leaves a film of excellent quality even without the addition of a plasticizer but where maximum flexibility is desired an amount of dibutyl phthalate or ethyl benzoylbenzoate equal to about 5–10% of the resin may be added.

*Example 2*

A resin is prepared with 10% of phthalide instead of 50% of phthalide, calculated in term of mols. It is less elastic than the resin prepared according to Example 1 but shows a far less brittleness than an unmodified glycerine phthalate resin produced under the same conditions.

*Example 3*

A resin is prepared according to Example 1 with 1 mol of glycerin, 1 mol phthalic anhydride, ½ mol phthalide and ½ mol benzoic acid. A very tough, light-colored resin is obtained which shows a remarkable increase in toughness over a corresponding resin in which all of the phthalide is substituted by benzoic acid.

*Example 4*

A resin is prepared with 1 mol of glycerin, 0.75 mol phthalic anhydride, 1 mol phthalide, and 0.5 mol fatty acid of cocoanut oil. The resulting resin is soft, very flexible and of light color. It shows high compatibility with nitrocellulose and can be used without any plasticizer to form satisfactory films when dissolved in a suitable solvent.

*Example 5*

A resin is prepared with 1 mol of glycerin or polyglycerols and .75 mol of maleic acid, 1 mol of phthalide and .5 mol benzoylbenzoic acid. A light-colored, hard, elastic resin is obtained.

*Example 6*

A resin is prepared and 1½ mol of ethylene glycol, 1 mol of phthalic anhydride and 1 mol of phthalide or hexahydrophthalide. A soft, balsam-like resin is obtained which is an excellent plasticizer and which will not become infusible on heating to 260° C.

In the claims the expression "phthalide substance" is intended to cover phthalide, its substitution and hydrogenation products. Wherever the word "phthalide" is used alone in a claim, the unsubstituted phtalide is meant.

What is claimed as new is:

1. A synthetic resin of the polyhydric alcohol organic acid type in which a portion of the acid is replaced by a phthalide substance.

2. A synthetic resin of the polyhydric alcohol organic acid type in which a portion of the acid is replaced by phthalide.

3. A synthetic resin, being the condensation product of at least one polyhydric alcohol, at least one polybasic acid, and at least one phthalide substance.

4. A synthetic resin, being the condensation product of at least one polyhydric alcohol, at least one polybasic acid and phthalide.

5. A synthetic resin which is the condensation product of at least one polyhydric alcohol, at least one polycarboxylic acid, at least one monocarboxylic acid and a phthalide substance.

6. A synthetic resin which is the condensation product of at least one polyhydric alcohol, at least one polycarboxylic acid, at least one monocarboxylic acid and phthalide.

7. A synthetic resin, being the condensation product of at least one polyhydric alcohol, phthalic anhydride and a phthalide substance.

8. A synthetic resin, being the condensation product of at least one polyhydric alcohol, phthalic anhydride and phthalide.

9. A synthetic resin, being the condensation product of glycerin, phthalic anhydride, and a phthalide substance.

10. A synthetic resin, being the condensation product of glycerin, phthalic anhydride and phthalide.

11. A resin according to claim 9, in which the glycerin, phthalic anhydride and phthalide substance are present in approximately equimolecular proportions.

12. A resin according to claim 10, in which the glycerin, phthalic anhydride and phthalide are present in approximately equimolecular proportions.

13. A method of preparing a synthetic resin, which comprises bringing about condensation of a polyhydric alcohol with an organic carboxylic acid capable of forming a resin therewith, the amount of the acid being less than sufficient to react with all of the hydroxyls of the polyhydric alcohol, adding an amount of a phthalide substance at least sufficient to react with the unreacted hydroxyls of the polyhydric alcohol, and bringing about the reaction between the condensation product and the phthalide substance.

14. A method of preparing a synthetic resin, which comprises bringing about condensation of a polyhydric alcohol with an organic carboxylic acid capable of forming a resin therewith, the amount of the acid being less than sufficient to react with all of the hydroxyls of the polyhydric alcohol, adding an amount of phthalide at least sufficient to react with the unreacted hydroxyls of the polyhydric alcohol, and bringing about the reaction between the condensation product and phthalide.

15. A method of preparing a synthetic resin, which comprises causing glycerin to condense with an amount of phthalic anhydride insufficient to react with all of the hydroxyls of the glycerin, adding a phthalide substance at least sufficient to react with the unreacted hydroxyls of the glycerin, and bringing about condensation between the glycerin phthalic condensation product and the phthalide substance.

16. A method of preparing a synthetic resin, which comprises causing glycerin to condense with an amount of phthalic anhydride insufficient to react with all of the hydroxyls of the glycerin, adding phthalide at least sufficient to react with the unreacted hydroxyls of the glycerin, and bringing about condensation between the glycerin phthalic condensation product and phthalide.

17. A method of preparing a synthetic resin which comprises causing one mol of glycerin to condense with one mol of phthalic anhydride, adding a mol of phthalide and continuing the condensation.

18. A method according to claim 17, in which the condensation of the phthalide with the glycerin phthalic anhydride condensation product takes place at a temperature higher than that employed in condensing the phthalic anhydride with the glycerin.

19. A method according to claim 17, in which the glycerin and phthalic anhydride are condensed at about 180° C. and phthalide is condensed with the condensation product thus obtained at about 210° C.

Signed at Pittsburgh, Pennsylvania, this 17th day of July, 1931.

ALPHONS O. JAEGER.